Oct. 12, 1971    SHIGEAKI KURAMOCHI    3,611,586
INSTRUCTIONAL TYPEWRITER
Filed March 20, 1969
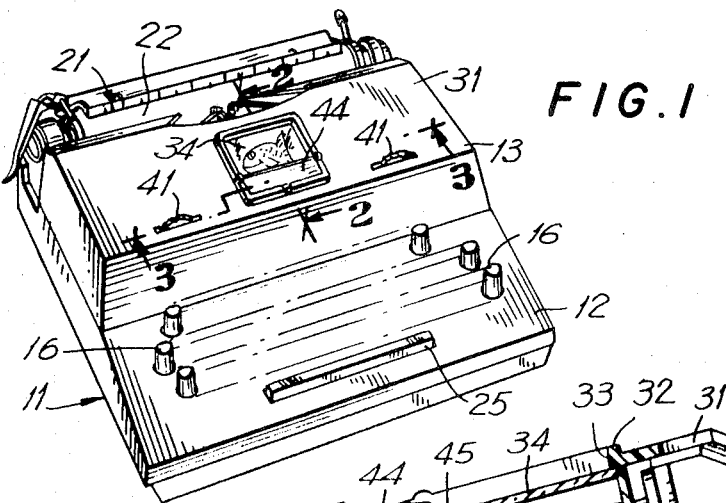
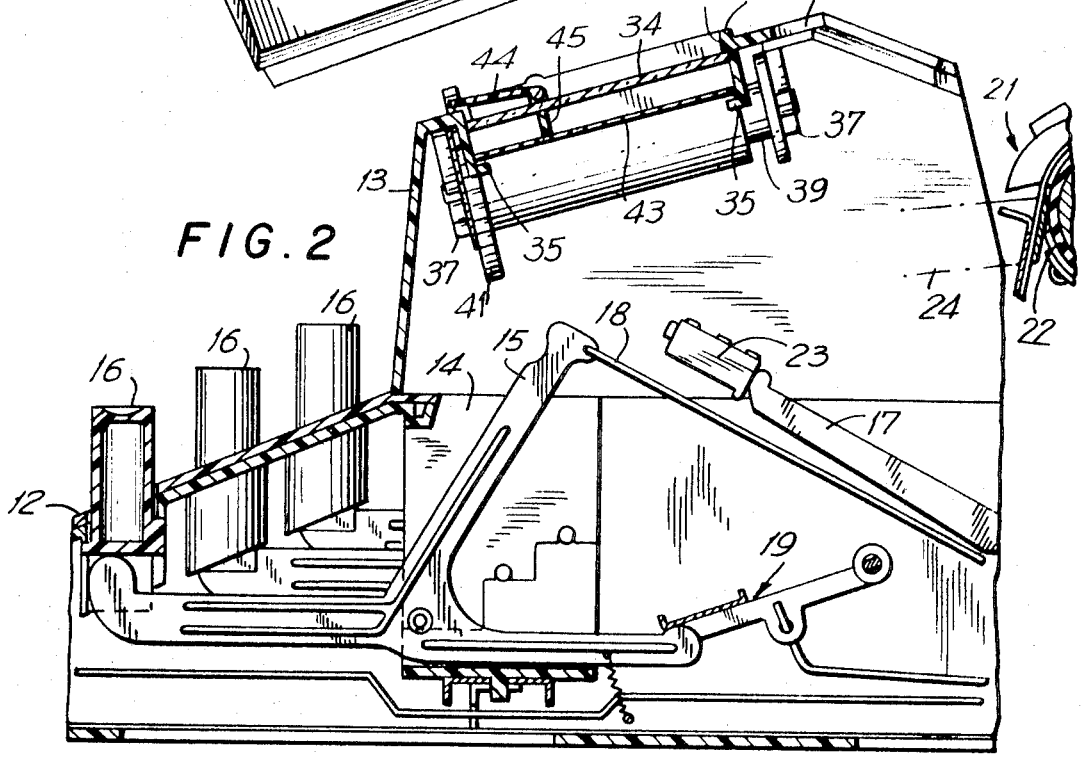
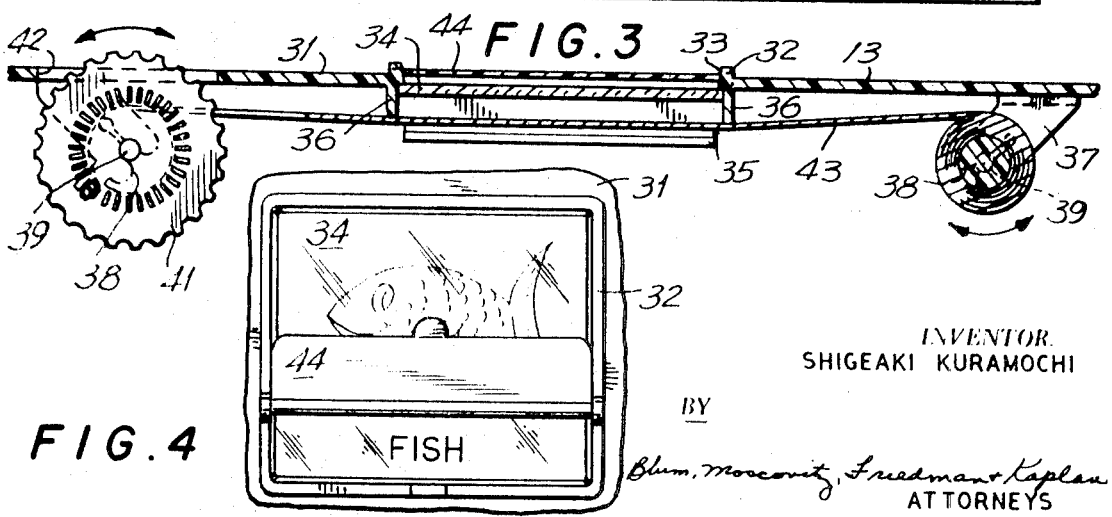
INVENTOR.
SHIGEAKI KURAMOCHI
BY
Blum, Moscovitz, Friedman & Kaplan
ATTORNEYS United States Patent Office 3,611,586
Patented Oct. 12, 1971

3,611,586
INSTRUCTIONAL TYPEWRITER
Shigeaki Kuramochi, Tokyo, Japan, assignor to Louis Marx & Co., Inc., New York, N.Y.
Filed Mar. 20, 1969, Ser. No. 808,918
Int. Cl. G09b 13/00
U.S. Cl. 35—6                                         6 Claims

ABSTRACT OF THE DISCLOSURE

A typewriter capable of being used as an instructional device for correlating visual images with printed words by means of which a student can type the word identifying the visual image and thereafter compare the printed word associated with the visual image with the word the student has typed to verify the accuracy of the typed word.

BACKGROUND OF THE INVENTION

Numerous teaching aid devices have been developed to aid the student in reading, spelling, mathematics, and the like. Many of the devices are useful as instructional devices only and thus quickly lose their value or usefulness when the level of the student is beyond the level of the instructional device. Typewriters have long-lasting value for the student but it has not previously been known to combine a simple instructional device with the typewriter which will add to the usefulness of the typewriter and yet will not detract from the functional operation of the typewriter.

SUMMARY OF THE INVENTION

Generally speaking, in accordance with the invention, there is associated with any known type of typewriter a device for carrying thereon visual images and words identifying the visual images with the words being selectively viewable. In a preferred embodiment, the typewriter cover has a window through which the visual images and words may be viewed with a portion of the window selectively blocked off for selectively preventing observation of the words through the window. An elongated strip is supported below the window and may be indexed to bring the desired visual images into view. The instructional device in no way interferes with the operation of the typewriter and the instructional device can be used or not used, as desired. Accordingly, it is an object of this invention to provide an improved and simplified instructional device in conjunction with a typewriter which can be used to teach word recognition and spelling and which does not interfere with the operation of the typewriter.

Another object of the invention is to provide an instructional device of simple construction which can be readily changed to provide an almost limitless number of objects to be identified by the student and words associated therewith to be spelled by the student whereby the difficulty of the problems presented to the student can be changed at will to suit the level of the student.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWING

For a fuller understanding of the invention, reference is had to the following description taken in connection with the accompanying drawing, in which:

FIG. 1 is a perspective view of a typewriter having an instructional device constructed in accordance with a preferred embodiment of the instant invention combined therewith;

FIG. 2 is a partial sectional view, at an enlarged scale, taken along line 2—2 of FIG. 1;

FIG. 3 is a partial sectional view, at an enlarged scale, taken along line 3—3 of FIG. 1;

FIG. 4 is a partial plan view of the window portion of the typewriter having the printed word blocking door in position to permit the printed word to be viewed.

DESCRIPTION OF THE PREFERRED EMBODIMENT

The typewriter of the instant invention having the instructional device incorporated therein may have a typing mechanism of any suitable construction. For simplicity a typewriter constructed as shown in U.S. Pat. No. 3,338,369, issued Aug. 29, 1967 to Willis E. Rexford has been depicted and only so much of the typing mechanism as is necessary to show the environment for the instructional device has been shown in the instant drawing. The typewriter is indicated generally at 11 and includes a casing or housing 12 and a cover 13. Within the casing 12 is provided a frame 14 which carries a plurality of key levers 15, each of which is operated by a key 16. Each key lever 15 operates an associated type bar 17 through a link 18 and each key lever 15 also acts on a universal bar 19 which operates an escapement mechanism (not shown). A portion of the carriage assembly 21 is shown and includes a platen 22 against which the type segment 23 strikes in order to print a letter. Typewriter 24 is indicated in phantom. The typewriter 11 also includes a space bar 25 which actuates the escapement mechanism (not shown).

Cover 13 is removably connected to casing 12 by any suitable means. The cover 13 includes a planar portion 31 which forms an integral part of the instructional device. At substantially the center of planar portion 31 there is located a frame 32 defining a window opening 33. As cover 13 is preferably fabricated of plastic material, frame 32 can be molded integrally therewith. A transparent plastic window 34 is secured within frame 32 so as to close the window opening 33 without affecting the transparency of same. Frame 32 also has depending therefrom a pair of channel members 35 and a pair of guides 36 (FIG. 3).

Spaced to each side of frame 32 is a pair of bracket members 37 which are slotted as at 38 to receive therein rollers 39. The rollers 39 are rotatably mounted in slotted ends 38 and are removable therefrom. Each roller 39 includes a wheel 41 which extends upwardly through a slot 42 in planar portion 31 whereby a portion of the peripheral edge of each wheel 41 projects upwardly beyond the planar portion 31 as shown in FIG. 1. Through the upwardly projecting portions of wheels 41, rollers 39 may be rotated. Wound about and extending between the spaced rollers 39 is an elongated strip 43 which is threaded beneath the window 34 so as to be guided by channel member 35 and positioned by guides 36. Imprinted on the top surface of strip 43 at spaced locations, are a plurality of questions and answers with the answer appearing below each question. For example, a picture of a fish may be depicted on the upper portion of the strip 43 and the word "fish" printed below the picture. The picture becomes the question and the identifying word becomes the answer.

A door 44 is pivoted to frame 32 and normally covers the lower portion of the window 34 as shown in FIG. 1. When wheels 41 have been rotated to bring the fish on the strip 43 into view below the window 34 as shown in FIG. 1, the word "fish" is blocked from view by door 44. The student then types the word describing the object and thereafter lifts door 44 to the position shown in FIG. 4 to expose the word. In this manner, the student can check his spelling against the correct spelling. The door 44 is then returned to the normal position and wheels 41 rotated in either direction to bring a different picture or question into view through the window 34. A strip 43 may be removed by removing rollers 39 from the underside of cover 13 and inserting a different strip 43 with different material imprinted thereon. Such material can be in the form of pictures and words which are more difficult or questions can be posed requiring the student to type the answer and then verify the answer by lifting door 44. Note that frame 32 includes a dividing member 45 which prevents the lower portion of strip 43 from being read through the upper portion of window 34.

From the foregoing, it can be seen that the instructional device can be used in conjunction with the typewriter whereby the student practices his typing skill and becomes familiar with the typewriter and also learns by use of the instructional device. The instructional device does not interfere with use of the typewriter and thus the typewriter may be used independent of the instructional device.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawing shall be interpreted as illustrative and not in a limiting sense.

What is claimed is:

1. In an instructional typewriter for typing words and symbols, the combination of a housing, a casing cover member having a generally upwardly and rearwardly extending planar portion, one surface of said planar portion forming an exterior surface, the opposite surface being an interior surface, frame means defining a window in said planar portion, door means carried by said frame means for selectively blocking a portion of said window, said door means being generally smaller in size than said window to always expose a portion of said window, and information-carrying means carried by said opposite surface for selectively positioning information in viewing position with respect to said window, said information-carrying means including pictures and words or symbols identifying said pictures, said door means being sufficiently large to completely cover said words or symbols in one position of said door means.

2. The combination as claimed in claim 1 wherein said information-carrying means includes a strip on which is located indicia posing a question and indicia supplying an answer, said indicia supplying an answer being located with respect to said window to be selectively blocked by said door means.

3. The combination as claimed in claim 2 wherein said information-carrying means includes a pair of rollers rotatably mounted on said opposite surface, said strip being wound about and extending between said rollers.

4. The combination as claimed in claim 3 wherein each of said rollers includes a wheel, a portion of each wheel extending through said planar portion to permit said wheel to be rotated exteriorly of said planar portion.

5. The combination as claimed in claim 4 including means to removeably mount each of said rollers on said opposite surface.

6. The combination as claimed in claim 2 wherein said frame means includes strip guide members extending interiorly of said casing cover member for guiding said strip and positioning said strip adjacent said window.

References Cited

UNITED STATES PATENTS

| | | | |
|---|---|---|---|
| 342,737 | 5/1886 | Dougherty | 35—6 |
| 442,467 | 12/1890 | Ward | 197—180 X |
| 1,559,665 | 11/1925 | Beery et al. | 40—347 X |
| 2,624,126 | 1/1953 | Bolognino et al. | 35—6 UX |
| 2,690,697 | 10/1954 | Rocca | 35—6 UX |
| 2,832,315 | 4/1958 | Volmars | 40—347 X |
| 3,095,654 | 7/1963 | Cummings | 35—6 X |
| 3,201,875 | 8/1965 | Porteus et al. | 35—6 |
| 1,866,582 | 7/1932 | Smith | 197—186 BX |
| 2,782,895 | 2/1957 | Winter et al. | 197—186 R |

ERNEST T. WRIGHT, JR., Primary Examiner

U.S. Cl. X.R.

197—181.1, 186 R; 35—35 D